United States Patent [19]
Neibaur et al.

[11] Patent Number: 5,721,787
[45] Date of Patent: Feb. 24, 1998

[54] SPEAKER PORTING FOR A COMMUNICATION DEVICE

[75] Inventors: Wesley B. Neibaur; Steven J. Finch, both of Plantation, Fla.

[73] Assignee: Motorola, Inc., Schaumburg, Ill.

[21] Appl. No.: 782,377

[22] Filed: Jan. 13, 1997

[51] Int. Cl.⁶ .................. H04R 25/00; H04B 1/08
[52] U.S. Cl. ............... 381/205; 381/169; 455/569; 455/575
[58] Field of Search ........................ 381/205, 188, 381/87; 455/575, 569, 90, 351; 361/814; 174/35 R; 379/428, 433

[56] References Cited

U.S. PATENT DOCUMENTS

| | | | |
|---|---|---|---|
| 3,306,990 | 2/1967 | Walker | 179/102 |
| 3,938,618 | 2/1976 | Ambruoso, Sr. | 181/155 |
| 4,196,791 | 4/1980 | Gottlieb | 181/155 |
| 4,225,970 | 9/1980 | Jaramillo et al. | 455/575 |
| 4,679,233 | 7/1987 | Richardson et al. | 379/433 |
| 4,719,322 | 1/1988 | Guzik et al. | 455/575 |
| 5,513,996 | 5/1996 | Annerino et al. | 439/95 |
| 5,588,041 | 12/1996 | Meyer, Jr. et al. | 379/59 |
| 5,596,487 | 1/1997 | Castaneda et al. | 361/814 |
| 5,603,103 | 2/1997 | Halttunen et al. | 455/575 |

*Primary Examiner*—Sinh Tran
*Attorney, Agent, or Firm*—Barbara R. Doutre

[57] ABSTRACT

A radio (100) includes an improved speaker porting apparatus which minimizes the occurrence of water intrusion. A keypad membrane (106) has an opening (126) through its front and back surfaces and includes tunneled speaker porting (134) formed within the back surface (122) to direct audio into the opening (126). A circuit board (108) fits onto the back surface (122) of the keypad membrane (106), the circuit board (108) includes speaker porting holes (128) divided into first and second halves (130, 132). The first half of the speaker porting holes (130) align with the opening (126) of the keypad membrane (106) while the second half of the speaker porting holes (132) align with the tunneled speaker porting (134) of the keypad membrane (106). A speaker cone (138) covers the first and second halves of the speaker porting holes (130, 132).

5 Claims, 4 Drawing Sheets

SPEAKER PORTING FOR A COMMUNICATION DEVICE

TECHNICAL FIELD

This invention relates in general to communication devices and more specifically to speaker porting in communication devices.

BACKGROUND

As communication devices, such as portable radios and telephones, become miniaturized and more highly integrated, the available space for implementing necessary features becomes limited. The desirability of providing easily accessible user features, such as a larger keypad or larger display, contrasts with the limited space available on the outside housing of the communication device. Speaker porting has always presented a challenge in radio housing designs in that space must be provided for an opening to the outside world which permits the passage of sound. Speaker distortion is introduced when the porting of small diameter speakers is not balanced and this distortion degrades the audio quality of the radio. The problem is further exacerbated in ruggedized versions of radio products which must meet higher standards of mechanical reliability and integrity. In particular, the prevention of water intrusion can be a problem when designing radio speaker porting in that openings to the outside world are needed to allow the passage of sound but the intrusion of water must be minimized.

Accordingly, there is a need for an improved apparatus for speaker porting in a communication device which provides balanced audio acoustics while minimizing water intrusion.

DETAILED DESCRIPTION OF THE PREFERRED EMBODIMENT

Figure 1:
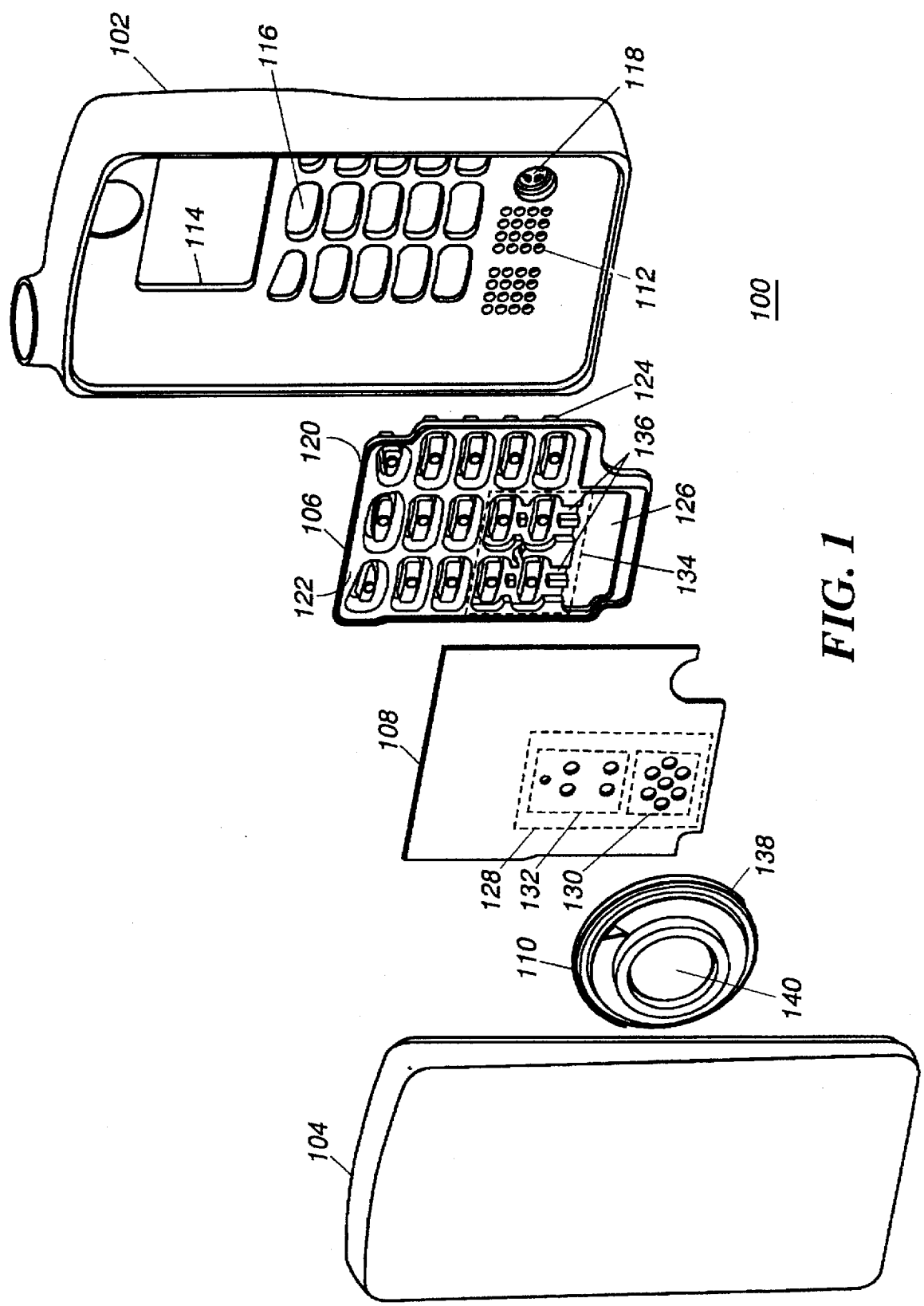
FIG. 1 is an exploded view of a radio assembly implementing speaker porting in accordance with the present invention.

While the specification concludes with claims defining the features of the invention that are regarded as novel, it is believed that the invention will be better understood from a consideration of the following description in conjunction with the drawing figures, in which like reference numerals are carried forward.

The apparatus to be described herein addresses the issue of providing a ruggedized portable communication device, such as a portable radio, which prevents water intrusion through the speaker. Referring now to FIG. 1, there is shown an exploded view of a radio assembly 100 in accordance with the present invention. The radio 100 includes front and back housings 102, 104 respectively, a keypad 106, a circuit board 108, and a speaker 110. The front housing 102 includes a variety of apertures including a plurality of speaker apertures 112, an opening for a display 114, apertures for a keypad 116, and a microphone port 118. In accordance with the present invention, the speaker apertures 112 will also be referred to as a speaker grill and an apertured wall.

In accordance with the present invention, the keypad 106 comprises a unitarily molded flexible keypad membrane having front and back surfaces 120, 122 respectively. A plurality of molded keys 124 protrude from the front surface 120 and an opening 126 is formed through the front and back surfaces 120, 122. The front surface 120 of the keypad is fitted into the front housing 102 such that the molded keys are received by the keypad apertures 116 and the opening 126 aligns about the speaker apertures 112.

In accordance with the present invention, circuit board 108 includes a plurality of audio ports 128 formed therethrough. The plurality of audio ports 128 are substantially divided into first and second sets of audio ports, also referred to as first and second sets of speaker porting holes, 130, 132 respectively. The circuit board 108, preferably a printed circuit board, is compressibly coupled or fitted to the keypad 106 such that the first set of speaker porting holes 130 are substantially aligned within the opening 126 of the keypad membrane 106.

In accordance with the present invention, the back surface 122 of the keypad membrane 106 further includes a plurality of recessed channels, or tunnels, 134 formed therein. When the circuit board 108 is fitted onto the keypad 106, the recessed channels 134 substantially align with the second set of audio ports 132. The recessed channels 134 provide a pathway within which audio traveling from the speaker 110 through the second set of audio ports 132 can be directed to the opening 126 within the keypad membrane 106. The tunnel 134 is created by molding a recessed channel within the bottom surface of the keypad 106. When the circuit board is coupled to the keypad a tunnel is formed. The tunnel 134 creates a recessed area over the second set of audio ports and provides a pathway for sound to travel into the opening 126 of the keypad 106 through openings 136.

The speaker 110, which includes a speaker cone 138 and magnet 140, converts the radio's electrical signals into audio signals. In accordance with the present invention, the perimeter of the cone 138 is adhesively coupled to the circuit board 108 such that speaker cone covers the first and second sets of audio ports 130, 132. Thus, the audio signals generated at the speaker can pass through the first and second sets of audio ports 130, 132. Audio passing through the first set of audio ports 130 can pass through the opening 126 of the keypad 106 and through speaker grill 112. In accordance with the present invention, audio passing through the second set of audio ports 132 passes through the tunneled speaker porting of the keypad, into the opening 126, and out through the speaker grill 112. A piece of water resistant felt (not shown) is preferably included between the speaker grill 112 and the first set of audio porting holes 130 to further minimize the water intrusion.

Figure 2:
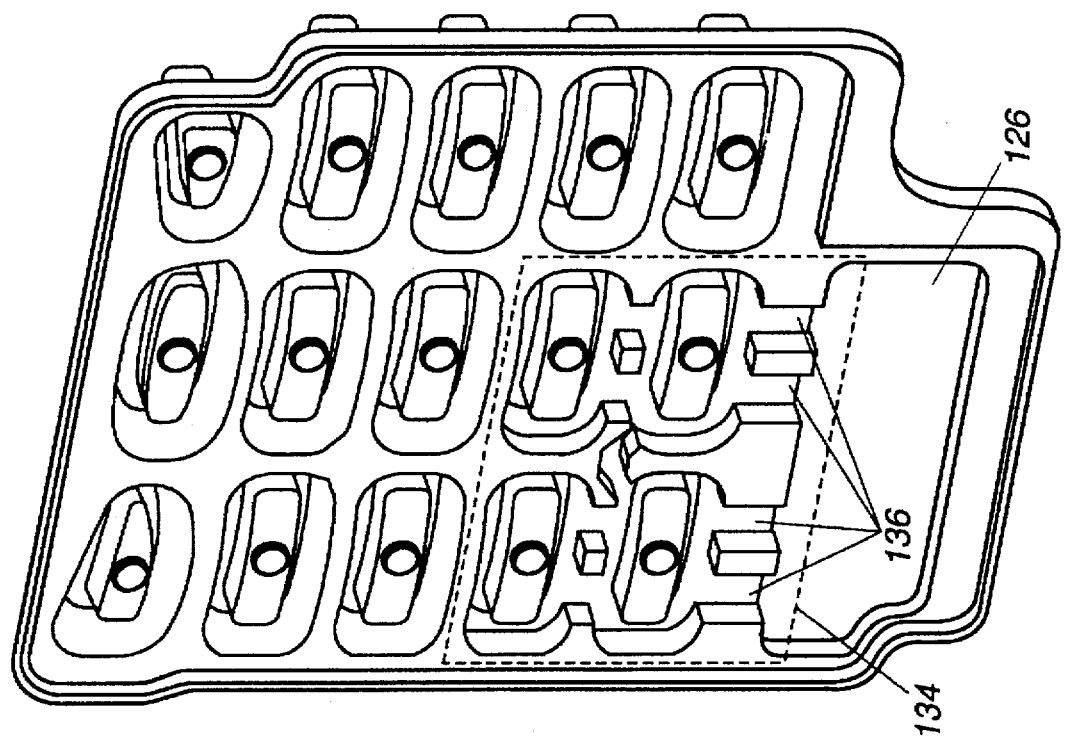
FIG. 2 is an enlarged view of the keypad of FIG. 1.

FIG. 2 shows an enlarged view of the keypad 106 having recessed channels 134, openings 136, and opening 126 in accordance with the present invention.

Figure 3:
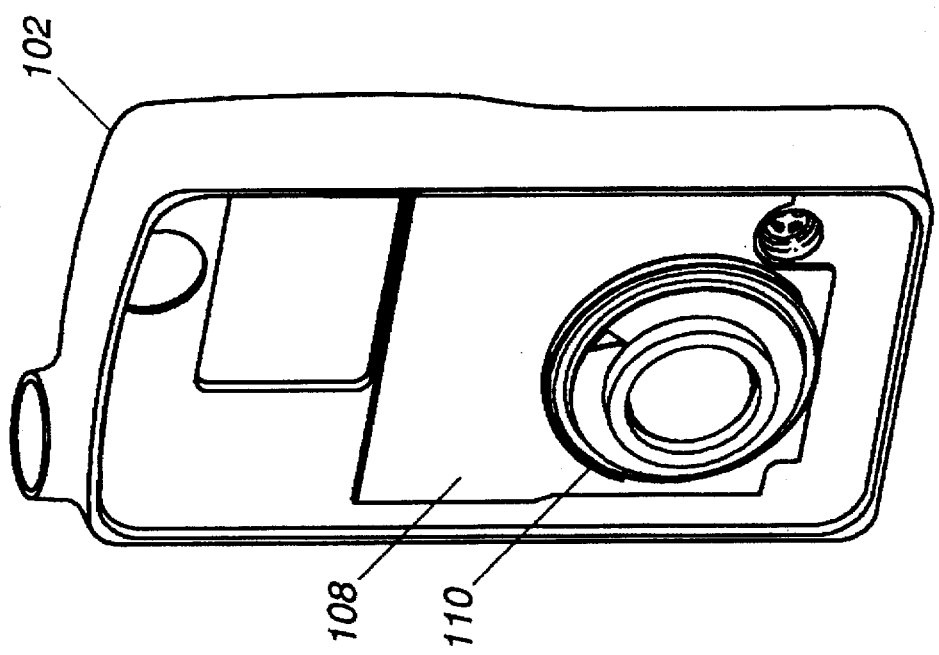
FIG. 3 is a non-exploded view of the speaker porting assembly of FIG. 1 in accordance with the present invention.

FIG. 3 shows the assembled version of the assembly of FIG. 1 minus the back housing 104. Implementing the tunneled speaker porting of the present invention into a keypad provides for balanced audio conditions while minimizing the occurrence of water intrusion. By using a plurality of audio porting holes and concealing approximately half of them with the keypad, the occurrence of water intrusion can be reduced. The balanced audio is maintained by channeling the audio coming through the covered audio ports 132 through the recessed channels 134 of the keypad 106 and into the opening of the keypad 126.

Figure 4:
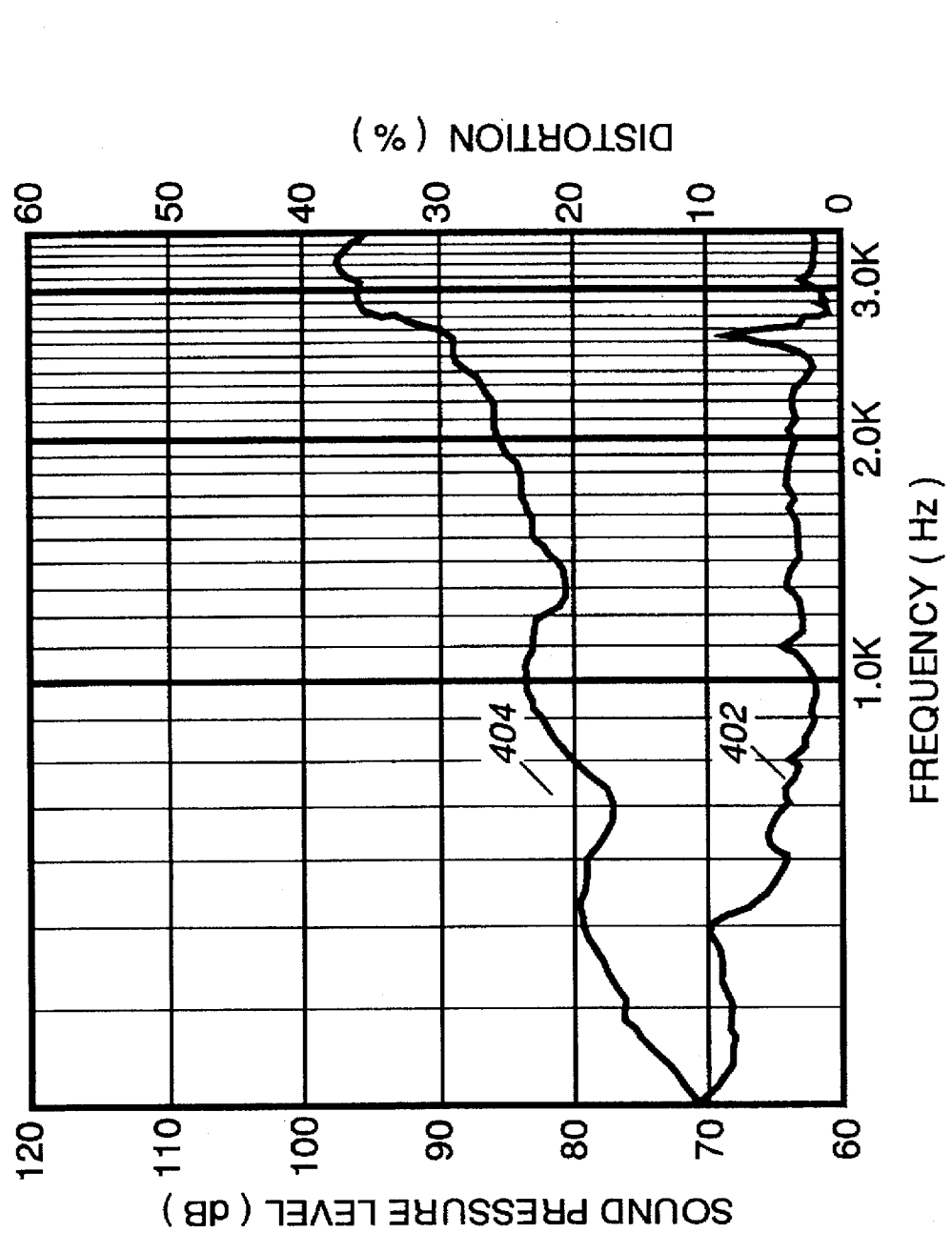
FIG. 4 is a graph illustrating a sample frequency response for a radio implementing the speaker assembly of FIG. 1 in accordance with the present invention.

FIG. 4 shows a sample of data taken from a radio implementing the speaker porting assembly in accordance with the present invention. Graph 400 depicts frequency in hertz (Hz) versus sound pressure level (SPL) measured in decibels (dB) and percent distortion. Line 402 shows percent distortion and line 404 shows SPL. The sample data shows an average SPL level of approximately 87.9 dB between 300 to 3 KHz with an equivalent loudness from a weighted speech spectrum between 300 to 3 KHz of 72.15 dB.

Accordingly, there has been provided a radio having improved water intrusion protection. Larger user features, such as displays and keys, can also be implemented, because the size of the speaker grill can be reduced. Increasing the size of user features is especially desirable in ruggedized radios where the user may be wearing thick gloves or require improved visuals. By providing recessed channels within the keypad membrane with which to cover half of the audio ports and opening these channels into a ported audio area, balanced audio can be maintained while water intrusion is minimized.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A speaker porting apparatus, comprising:

a housing having a speaker grill;

a speaker for translating electrical signals into audio;

a circuit board having a plurality of audio ports formed therethrough, the speaker aligning with the circuit board such that the audio is passed through the plurality of audio ports, the plurality of audio ports being divided into a first set of audio ports and a second set of audio ports, the first set of audio ports aligning with the speaker grill of the housing; and a flexible membrane coupled between the circuit board and the housing, the flexible membrane including an opening between the first set of audio ports and the speaker grill, the flexible membrane further including a plurality of recessed channels formed therein and substantially aligning with the second set of audio ports, the recessed channels providing a pathway for directing audio traveling from the speaker through the second set of audio ports to the opening within the flexible membrane.

2. A communication device, including:

a housing having an apertured wall;

a circuit board located within the housing, the circuit board including first and second sets of audio ports;

a speaker including a cone and a magnet, the cone being adhesively coupled to the circuit board such that the cone covers the first and second sets of audio ports and audio is directed through the first and second sets of audio ports;

a keypad coupled to the circuit board, the keypad including recessed channels formed therein to provide a pathway for audio, the recessed channels aligning with the first set of audio ports of the circuit board; and the apertured wall of the housing aligning with the second set of audio ports.

3. A communication device as described in claim 2, wherein the communication device comprises a portable radio.

4. A radio, comprising:

a housing having a plurality of speaker apertures disposed thereon;

a keypad membrane coupled to the housing and having an opening substantially aligned with the plurality of apertures, the keypad membrane also including channels formed therein;

a printed circuit board compressibly coupled to the keypad membrane, the printed circuit board including first and second sets of speaker porting holes, the first set of speaker porting holes being substantially aligned with the opening of the keypad membrane, the second set of speaker porting holes being substantially aligned with the channels formed within the keypad membrane; and a speaker adhesively coupled to the printed circuit board so as to enclose the first and second set of speaker porting holes.

5. A radio, comprising:

a front and back housing, the front housing including a first set of apertures and a second set of apertures;

a unitarily molded keypad membrane having front and back surfaces with a plurality of molded keys protruding from the front surface and an opening formed through the front and back surfaces, the front surface of the keypad membrane being fitted into the front housing such that the molded keys are received by the first set of apertures and the opening aligns with the second set of apertures, the back surface of the keypad membrane including tunneled speaker porting formed therein to direct audio into the opening;

a circuit board fitted onto the back surface of the unitarily molded keypad membrane, the circuit board including speaker porting holes divided into first and second halves, the first half of the speaker porting holes being aligned with the opening of the keypad membrane and the second half of the speaker porting holes being aligned with the tunneled speaker porting of the keypad membrane; and a speaker including a speaker cone having a perimeter, the perimeter of the speaker cone being adhesively coupled to the circuit board such that the speaker cone covers the first and second halves of the speaker porting holes.

\* \* \* \* \*